United States Patent
Fu et al.

(10) Patent No.: US 10,189,726 B2
(45) Date of Patent: Jan. 29, 2019

(54) ELECTROCHEMICAL DESALINATION FOR OIL RECOVERY

(71) Applicant: Evoqua Water Technologies Pte. Ltd., Singapore (SG)

(72) Inventors: Rongqiang Fu, Choa Chu Kang Crescent (SG); Li-Shiang Liang, Harvard, MA (US); Kee Hoe Ng, Singapore (SG)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 14/347,355

(22) PCT Filed: Sep. 28, 2012

(86) PCT No.: PCT/US2012/057922
§ 371 (c)(1),
(2) Date: Mar. 26, 2014

(87) PCT Pub. No.: WO2013/049572
PCT Pub. Date: Apr. 4, 2013

(65) Prior Publication Data
US 2014/0216934 A1     Aug. 7, 2014

Related U.S. Application Data

(60) Provisional application No. 61/540,731, filed on Sep. 29, 2011, provisional application No. 61/545,768, filed on Oct. 11, 2011.

(51) Int. Cl.
C02F 1/469 (2006.01)
E21B 43/20 (2006.01)
C02F 1/42 (2006.01)
C02F 101/10 (2006.01)
C02F 103/08 (2006.01)

(52) U.S. Cl.
CPC ............ *C02F 1/4695* (2013.01); *E21B 43/20* (2013.01); *C02F 2001/425* (2013.01); *C02F 2101/101* (2013.01); *C02F 2103/08* (2013.01); *C02F 2201/4614* (2013.01); *C02F 2201/46145* (2013.01); *C02F 2209/055* (2013.01); *C02F 2209/10* (2013.01); *C02F 2301/08* (2013.01); *Y02A 20/134* (2018.01)

(58) Field of Classification Search
CPC ....... E21B 43/20; C02F 1/4693; C02F 1/4695
See application file for complete search history.

(56) References Cited

U.S. PATENT DOCUMENTS

| | | |
|---|---|---|
| 5,376,250 A | 12/1994 | Hamano |
| 7,100,692 B2 | 9/2006 | Parsley et al. |
| 2004/0007358 A1* | 1/2004 | Lien ............................ 166/275 |

(Continued)

FOREIGN PATENT DOCUMENTS

| | | |
|---|---|---|
| EP | 2341372 A1 | 7/2011 |
| WO | 0212675 A1 | 2/2002 |

OTHER PUBLICATIONS

"Oil Recovery Overview." Mid-Con Energy Partners, LP. Feb. 15, 2012 capture of <http://www.midconenergypartners.com/oil-recovery-overview.php> using WayBack Machine Internet Archive.*

*Primary Examiner* — Steven A. Friday

(57) ABSTRACT

Electrically-driven separation systems and methods for use in oil recovery.

20 Claims, 13 Drawing Sheets

(56) References Cited

U.S. PATENT DOCUMENTS

| | | |
|---|---|---|
| 2004/0055955 A1* | 3/2004 | Davis .......................... 210/652 |
| 2005/0103644 A1* | 5/2005 | Wilkins ................. C02F 1/469 |
| | | 205/751 |
| 2007/0215344 A1* | 9/2007 | McElhiney ................... 166/246 |
| 2007/0284251 A1* | 12/2007 | Zuback et al. ............... 204/518 |
| 2008/0277341 A1* | 11/2008 | Huang et al. ................ 210/637 |
| 2010/0089756 A1* | 4/2010 | Wilkins et al. .............. 204/638 |
| 2010/0282689 A1 | 11/2010 | Ganzi et al. |

\* cited by examiner

ELECTROCHEMICAL DESALINATION FOR OIL RECOVERY

FIELD OF THE TECHNOLOGY

Aspects relate generally to the treatment of water containing undesirable contaminants with electrically-driven separation systems and methods. Specifically, the systems and methods of one or more aspects may be used on offshore oil platforms to facilitate and improve oil recovery or may be used to produce potable water.

BACKGROUND

Oil reservoirs generally exist deep within the earth under layers of soil and rock. Once an accumulation of oil has been located, a series of wells are drilled in a predetermined pattern to effectively drain the reservoir. The total amount of oil in a reservoir is often referred to as the amount of "original oil in place," abbreviated OOIP. The first stage of recovery is referred to as "primary recovery." In primary recovery, the natural reservoir pressure causes the oil to freely flow into the drilled production wells. However as time passes and the existing gas and water fully expand, the force exerted on the reservoir gradually dissipates and oil production decreases and ultimately stops. Primary recovery techniques are generally able to recover only about 10% to about 20% of the OOIP. After primary recovery methods have been exhausted, improved oil recovery methods must be used to recover additional OOIP. Secondary and tertiary methods can lead to a total recovery of up to about 50% of the total OOIP.

Secondary recovery often involves flooding the reservoir with water to force oil into the production wells. The water used in oil flooding must have a specific chemistry to not destabilize clay formations and render the soil surrounding the reservoir impermeable. The water must also be relatively low in salinity and nearly free of sulfate. Secondary recovery with water flooding can recover up to about an additional 20% to 30% of the OOIP.

Tertiary, also referred to as enhanced recovery, may involve flooding the well with water dosed with chemical agents. Tertiary recovery can result in an additional recovery of up to about 20% of the OOIP. In most cases, a substantial amount of oil is left in the reservoir even after tertiary treatment because the remaining OOIP cannot be recovered economically.

Improved oil recovery methods (i.e. secondary and tertiary methods) require a tremendous amount of water. It takes time to inject sufficient water to fill enough of the void spaces in the reservoir to move the OOIP. It takes several months from the start of a water flood before significant production increases take place and an average flood usually lasts from about six to about ten years.

SUMMARY

Aspects relate generally to the desalination of water by electrically-driven separation systems and methods.

In accordance with one or more aspects, a method for improved oil recovery is provided comprising introducing seawater to an electrically-driven separation system, treating the seawater with the electrically-driven separation system to produce treated water including less than about 200 mg/l of sulfate, and flooding at least a portion of an oil reservoir with the treated water.

In accordance with one or more aspects, a secondary oil recovery system is provided comprising an oil reservoir, a source of seawater, and an electrically-driven separation subsystem having an inlet fluidly connected to the source of seawater and an outlet fluidly connected to the oil reservoir, the electrically-driven separation subsystem constructed and arranged to produce water having less than about 200 mg/l of sulfate.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
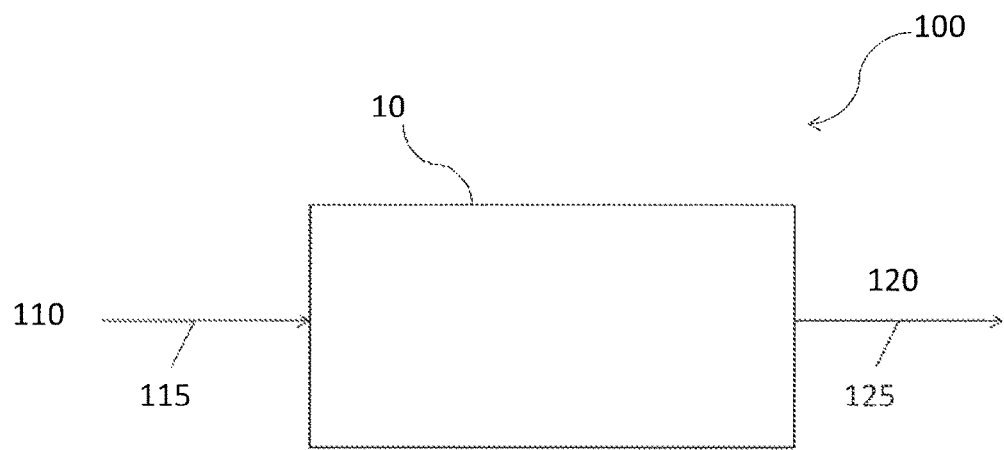
FIG. 1 presents a process diagram of an improved oil recovery system comprising an electrically-driven separation subsystem in accordance with one or more embodiments.

A large percentage of oil production occurs on man-made platforms located several miles from a shoreline. Offshore oil platforms and recovery from offshore wells is crucial to global oil production. Though these platforms have abundant access to water for flooding, the water must first be desalinated and rendered suitable for secondary and tertiary recoveries. Traditional desalination methods require large, heavy, equipment, the size and weight of which are expensive to install on platforms. The development of offshore platforms that have a square footage large enough to accommodate both desalination equipment and oil recovery equipment is costly. One square meter of space on an offshore platform costs roughly $1M, and each kilogram of weight to be supported by the platform translates to about $1,000 of capital. Additionally, traditional methods of desalination cannot control the quality of the product water. Generally, product water must be blended with a source of hardness to be rendered suitable for flooding. Traditional desalination systems are thus not only expensive to place on platforms, but inefficient at meeting the production demands of water flooding. In some non-limiting examples, water demand for flooding may be about 75,000 to about 150,000 barrels per day (bpd) which equates to about 11,925 m³/d to about 23850 m³/d.

Water used for water flooding may contain less than about 200 mg/l sulfate ($SO4^{2-}$), preferably less than about 100 mg/l sulfate, and most preferably less than about 40 mg/l sulfate. The removal of sulfate is of particular and unique importance in water flooding applications because the wells in which the flooding water is injected typically have environments that promote the growth of sulfate-reducing bacteria. Sulfate-reducing bacteria consume and thrive off sulfate and produce hydrogen sulfide, $H_2S$, as waste. Hydrogen sulfide produces a foul odor and degrades the quality of oil recovered. Oil containing high concentrations of sulfur is known as "sour." Sour oil is very corrosive and high concentrations of hydrogen sulfide can be lethal. Sour oil must thus first be treated to remove hydrogen sulfide before it can be safely transported and used. Sulfate can precipitate out from water and an excess of sulfate ions in flooding water can promote the growth of sulfate-reducing bacteria and thus increase the amount of hydrogen sulfide present in an oil well and the oil recovered. It is thus important that water injected into oil wells have as little sulfate as possible.

Flooding water preferably contains about 1000 mg/l to about 5000 mg/l total dissolved solids (TDS) and about 400 parts per million (ppm) of hardness ($Ca^{2+}$ and $Mg^{2+}$). The ratio of divalent cations to total cations must also be controlled to avoid the destabilization of clay formations in the well. Destabilization of clay formations can cause the well soil to become impermeable to the flood water, which adversely impacts the efficacy of the flood and reduces the OOIP production. To achieve maximum recovery from a flood, the ratio of hardness in the flood water may be altered to accommodate the unique geological conditions of each production site.

Traditional water flooding employed by off-shore platforms generally involves the desalting of seawater by reverse osmosis. Reverse osmosis membranes are generally divalent selective and may remove too great a percentage of hardness present in raw seawater. Reverse osmosis also removes a much greater than necessary amount of the total dissolved solids. For instance, a typical reverse osmosis process treats seawater having a 35,000 mg/l TDS to a water having less than about 300 mg/l TDS. Water flooding water however requires only less than about 5000 mg/l TDS.

Reverse osmosis product water must be blended with a source of hardness to generate a water suitable for water flooding. Some improved oil recovery systems may re-mineralize reverse osmosis water by dosing the water with, for example, limestone and carbon dioxide. Other systems may include nanofiltration units to produce a source of less-pure water to blend with the reverse osmosis product. Re-mineralizing and blending are challenging because the composition and temperature of raw seawater naturally fluctuate. Fluctuations in feed temperature and composition cause the quality of the product water to fluctuate and alter the degree of re-mineralizing or blending. Generally, more reverse osmosis (and nanofiltration) product water than is required for the water flood must be produced to ensure that a water having the proper amount of hardness and sulfate can be generated. Excess water not used in the blend is discarded. Traditional water flooding systems are thus inefficient at producing water suitable for water flooding.

Additionally, reverse osmosis-based water flooding systems are large and heavy and therefore are costly to install on offshore platforms. Though reverse osmosis units can be scaled down to reduce footprint, the membrane surface area of the unit is directly proportional to the amount of throughput the unit can accommodate. Scaling down the size of the unit thus negatively impacts the production rate of product water. The energy demand per unit water produced and the product quality are independent of unit size and do not change when the footprint of the unit is reduced. Further, because the systems operate at pressures of up to about 6900 kPa, high pressure pumps and piping must be used to accommodate the high system pressures. The materials used to accommodate these system pressures are generally heavy, expensive, and susceptible to corrosion. Reverse osmosis and other pressure driven separation membranes are also highly sensitive to fouling.

In accordance with one or more embodiments, improved desalination methods and systems are provided that may advantageously be employed to treat a source of desalination water, such as seawater, brackish water, or any other source of water containing an undesirable level of salts, to produce a treated water suitable for use in improved oil recovery systems and methods. Seawater may have a concentration of total dissolved solids in a range of about 10,000 to about 45,000 ppm and may be treated to produce a treatment water suitable for water flooding applications. In certain examples, seawater may have a concentration of total dissolved solids of about 35,000 ppm. Brackish water may have a total dissolved solids content in a range of about 1000 ppm to about 10,000 ppm and may likewise be treated to produce water suitable for secondary oil recovery methods. Seawater may typically have, for example, a sulfate concentration of about 2700 ppm as $SO_4$ and a total hardness of about 6500 ppm as $CaCO_3$. In some non-limiting embodiments, produced water suitable for water flooding applications may have a sulfate level of up to about 200 ppm, and a hardness level of up to about 500 ppm, for example, about 400 ppm.

The desalination systems and methods in accordance with one or more embodiments may be electrically-driven and may produce water suitable for water flooding without the need to blend the produced water with an external source of dissolved solids. The systems of the present embodiments may have a smaller footprint and be lighter in weight than the traditional desalination systems typically installed on offshore platforms. The systems and methods of the present embodiments may advantageously be used on offshore platforms in place of traditional desalination methods to produce a comparable amount of flooding water having a desired composition while occupying less square footage on the platform. The systems and methods of the present embodiments may meet the requirements of traditional offshore desalination systems and methods while occupying less than about 55% of the square footage required by traditional systems. The reduced footprint of the systems and methods of the present embodiments may provide for substantial savings in capital cost. The systems and methods discussed herein may also advantageously operate at lower pressures and enable the use of lighter materials that are more resistant to corrosion.

In accordance with one or more embodiments, an electrically-driven separation system may treat a feed water having an elevated temperature. Elevated feed temperatures may allow the systems and methods of the present embodiments to consume less energy, produce a higher quality product, produce more product, and/or have a smaller footprint.

An electrically-driven separation apparatus or unit, as used herein, may generally refer to devices for purifying fluids with electrical fields. Such devices are commonly used to treat water and other liquids containing dissolved ionic species. Electrochemical devices that treat water in this manner include electrodeionization, electrodialysis and capacitive deionization devices. Within these devices are concentrating and diluting compartments separated by ion-selective membranes. An electrodialysis device typically includes alternating semipermeable anion and cation exchange membranes. Spaces between the membranes are configured to create liquid flow compartments with inlets and outlets. An applied electric field imposed via electrodes causes dissolved ions, attracted to their respective counter-electrodes, to migrate through the anion and cation exchange membranes. This generally results in the liquid of the diluting compartment being depleted of ions, and the liquid in the concentrating compartment being enriched with the transferred ions.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water may be inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream. Generally, the membranes in electrically-driven separation devices are selective to divalent ions and are typically inefficient at removing monovalent ions.

In both CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to ED and EDI devices. Commercially available ED devices are typically of plate-and-frame design, while EDI devices are available in both plate and frame and spiral configurations. Various embodiments are applicable to plate- and frame, spiral wound, and cross-flow designs as discussed herein.

In accordance with some embodiments, systems and methods of producing water suitable for water flooding from desalination water, such as seawater, are provided. The systems and methods may comprise fluidly connecting a feed stream of desalination water to an inlet of an electrically-driven separation apparatus. The systems and methods may further comprise fluidly connecting an outlet of the electrically-driven separation apparatus to an oil reservoir.

The electrically-driven separation systems and methods in accordance with one or more embodiments may advantageously allow a treated water to be tuned to have a specific set of desired properties. For example, the systems and methods of the present embodiments may be configured to produce a water having a first total dissolved solids content and may be subsequently tuned by altering at least one operating parameter to produce a water having a second total dissolved solids content. Similarly, the systems and methods of the present embodiments may produce a treated water having a first hardness and may enable an operator to adjust one or more parameters of the system to produce a water having a second hardness. Other properties of the water may similarly be selected by the adjustment of operating parameters. In this regard, the system can be adjusted to produce a treated water having desired properties. The systems and methods of the present embodiments may enable an operator to alter the composition of water produced to accommodate different commercial preferences and different geological conditions at individual oil reservoir sites. An operator may also tune a product water in response to fluctuations in the feed, variations in the reservoir being recovered, or in response to other system parameters.

In accordance with one or more embodiments, an electrically-driven separation system or subsystem may be more resilient to fouling than a comparable pressure driven separation system. In pressure driven systems, impurities contact the pressure driven filtration membranes directly and cause a layer of material to build on the membranes' surfaces. The flow rate of desalination water through a pressure driven separation system must be kept below a threshold value to reduce fouling. In electrically-driven separation systems, exchange membranes facilitate the transport of ions out of the treated water and the exchange membranes are not forcibly contacted by impurities. As a result of this operational difference, desalination water treated by an electrically-driven separation system may require less pretreatment than is necessary in pressure driven separation systems and may be more resilient to fouling. Because the systems and methods of the present embodiments may be more resilient to fouling, less pretreatment equipment may be required to pretreat raw desalination water introduced into the system. The reduction in pretreatment equipment may reduce the capital cost and footprint of the system.

In accordance with some embodiments, the desalination systems and methods may include an electrically-driven separation system. Referring to FIG. 1, system 100 comprises electrically-driven separation system 10. System 100 comprises a source of pretreated desalination water (not shown). Desalination water may be pretreated with media and mixed Media filters, such as sand filters. Pretreatment may also involve coagulation, flocculation and dissolved air floatation unit operation. Pretreatment may still further involve a polishing operation, for example, use of cartridge filters. Desalination water may also be chemically pretreated with disinfectants, such as chlorine, or other chemical agents. Desalination water may also undergo ultraviolet disinfection. As used herein "desalination water" is meant to encompass raw or pre-treated water to be desalinated. A feed of pretreated desalination water 110 is introduced into conduit 115. Conduit 115 is in fluid communication with subsystem 10. Conduit 115 may have an inlet in fluid communication with the source of desalination water. Desalination water 110 is fed through conduit 115 into electrically-driven separation system 10. Electrically-driven separation system 10 may involve ED in at least some embodiments. Electrically-driven separation system 10 receives desalination water 110 from conduit 115 and produces treated water 120. Treated water 120 may be fed into conduit 125. Conduit 125 may be in fluid communication with an oil reservoir (not shown). Treated water 120 may have a sulfate, total dissolved solids, and hardness content suitable for use in water flooding. Treated water 120 may, in accordance with other embodiments, also be suitable for use in tertiary oil recovery systems and methods.

Figure 2:
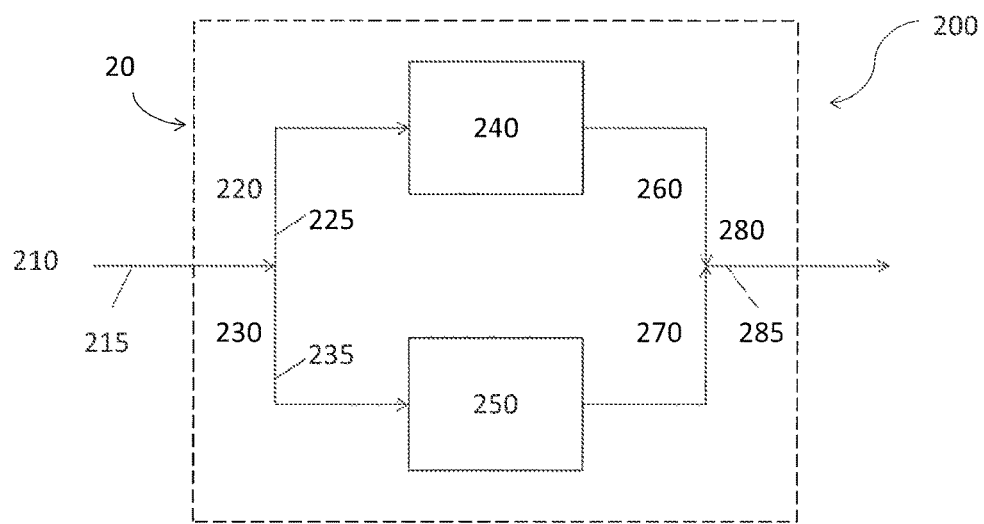
FIG. 2 presents a process diagram schematic of an improved oil recovery system comprising an electrically-driven separation subsystem in accordance with one or more embodiments.

In accordance with some embodiments, the desalination systems and methods may include a plurality of electrically-driven separation apparatuses. Referring to FIG. 2, system 200 comprises electrically-driven separation subsystem 20. System 200 having subsystem 20 includes two electrically-driven separation apparatuses 240 and 250 fluidly connected in parallel. Desalination water 210 may be fed through subsystem 20 to produce a treated water suitable for improved oil recovery systems and methods. Desalination water 210 is fed through conduit 215 and split into portions 220 and 230. Portion 220 of desalination water 210 is received by conduit 225 and fed to electrically-driven separation apparatus 240. Electrically-driven separation apparatus 240 produces product water 260. Portion 230 of water 210 is received by conduit 235 and fed to electrically-driven separation apparatus 250. Electrically-driven separation apparatus 250 produces product water 270. Product waters 260 and 270 combine to form treated water 280. Treated water 280 is received by conduit 285. Treated water 280 may have less than about 200 mg/l sulfate, less than about 100 mg/l sulfate, and in some embodiments, less than about 40 mg/l sulfate, a TDS content in the range of from about 1000 mg/l to about 5000 mg/l, and a hardness concentration in the range of from about 100 ppm to about 1000 ppm, and in some non-limiting embodiments, about 400 ppm. Treated water 120 may be suitable for secondary oil recovery methods and may be used in a water flood to improve oil recovery from an oil reservoir. Treated water 120 may, in accordance with other embodiments, be suitable for use in tertiary oil recovery systems and methods. Electrically-driven separation apparatuses 240 and 250 may be electrodialysis units, electrodeionization units, or a combination thereof.

In accordance with some embodiments, one or more electrically-driven separation apparatuses may be an electrodialysis unit having monovalent selective membranes. Referring again to FIG. 2, electrodialysis apparatus 240 may have standard cation and anion exchange membranes. Typically, standard cation and anion exchange membranes remove divalent ions to a much greater extent than monovalent ions. Electrodialysis apparatus 250 may have a standard anion exchange membrane and a monovalent selective cation exchange membrane.

The standard cation exchange membranes in electrodialysis apparatus 240 remove divalent cations from portion 220 of desalination water 210 to a greater extent than monovalent cations. The main species that contribute to water hardness are magnesium ($Mg^{2+}$), and calcium ($Ca^{2+}$), both of which are divalent ions. The standard anion exchange membranes in electrodialysis unit 240 remove both monovalent and divalent anions. The standard anion exchange membranes in electrodialysis unit 340 thus remove sulfate ($SO_4^{2-}$), a divalent ion. Electrodialysis apparatus 340 produces product water 260 that has a reduced concentration of ions, particularly a reduced concentration of divalent anions and cations. Unlike pressure driven separation apparatuses, the degree to which ionic species are removed by electrodialysis unit 240 is dependent in part on the conditions under which electrodialysis apparatus 240 is operated.

Referring now to electrodialysis apparatus 250, the monovalent selective cation exchange membranes do not efficiently remove divalent ions and thus a concentration of hardness in portion 230 of desalination water 210 is not substantially reduced by apparatus 250. Product water 270 treated by electrodialysis apparatus 250 contains significantly more hardness relative to product water 260. Electrodialysis unit 250 however has standard anion selective exchange membranes that preferentially remove divalent anions. Divalent anions, including sulfate, are removed by electrodialysis apparatus 250. The degree to which ionic species are removed by electrodialysis unit 250 is also dependent in part on the conditions under which electrodialysis apparatus 250 is operated.

Product waters 270 and 260 are combined to generate treated water 280. Product water 270 contains divalent ions, including magnesium and calcium. The presence of divalent ions in product water 270 may ensure that treated water 280 contains the correct divalent cation-to total cation ratio and the appropriate concentration of hardness for water flooding applications. Product waters 270 and 260 both contain reduced levels of sulfate due to the presence of the standard anion exchange membranes in electrodialysis apparatuses 240 and 250 respectively and thus treated water 280 may have a sulfate concentration suitable for water flooding. Product water 280 also has a reduced total dissolved solids concentration, however the total dissolved solids of product water 280 may be above the total dissolved solids concentration of water treated by pressure driven separation apparatuses, such as reverse osmosis. Treated water 280 may have less than about 200 mg/l sulfate, less than about 100 mg/l sulfate, and in some embodiments, less than about 40 mg/l sulfate, a TDS content in the range of from about 1000 mg/l to about 5000 mg/l, and a hardness concentration in the range of from about 100 ppm to about 1000 ppm, and in some non-limiting embodiments, about 400 ppm.

The quality of treated water 280 is dependent on the quality of treated waters 260 and 270, as well as the relative contribution of each product water to the total amount treated water 280 produced. Because the quality of product waters 260 and 270 are dependent on the conditions under which electrodialysis apparatuses 240 and 250 are operated, the quality of treated water 280 can be tuned by adjusting the operating parameters of apparatus 240, apparatus 250, or both. System 200 having electrodialysis subsystem 20 may advantageously enable the production of a treatment water suitable for improved oil recovery applications from desalination water having varying properties. The methods and systems of the present embodiments may also enable the production of a treatment water for water flooding having adjustable properties such that the treatment water produced can be tuned to accommodate the unique geological conditions present at individual oil reservoirs. The systems and methods of the present embodiments may also advantageously eliminate the need to produce an excess of product water, such as an excess of product water produced from reverse osmosis applications, and may eliminate the need to remineralize or blend a product water with a source of hardness.

In accordance with one or more embodiments, various properties of the feed stream delivered to the system for treatment, as well as the desired properties of water to be produced by the system, may impact one or more operational parameters. For example, the split between parallel unit operations may be adjusted accordingly in some embodiments. In other embodiments, the amount of monovalent selective membranes may be adjusted. In some non-limiting embodiments, for example, about 5% to about 15% of ion exchange membranes in the electrically-driven separation subsystem may be monovalent selective cation exchange membranes. In some specific non-limiting embodiments, about 5% of ion exchange membranes in the electrically-driven separation subsystem are monovalent selective cation exchange membranes.

The degree to which an electrically-driven separation apparatus, such electrodialysis units 240 and 250, will desalt a feed water is dependent on the electric potential applied to the cells. When a voltage is applied to a cell, it creates an electrical current across the cell. The electric current causes ions to transport out of the diluents. As voltage increases, current increases. The higher the electric current, the more ions will be transported out of the diluent. The increased transport of ions results in higher product quality. Product waters 260 and 270 can be adjusted to produce a desired treated water 280 by adjusting the voltage applied to electrodialysis apparatuses 240 and 250. Likewise, if the properties of desalination water 210 change, the applied voltage of apparatuses 240 and 250 can be adjusted in response to the change to maintain the desired properties of treated water 280.

The power consumed by an electrodialysis apparatus is dependent on electric current, flow rate, and the membrane surface area. The measure of current and flow rate in a cell are often expressed in terms of current density, where current density is the electric current per unit area. Increasing the current density increases the energy consumption, whereas increasing the membrane surface area decreases energy consumption.

In accordance with one or more embodiments, the footprint of an electrically-driven separation system may be smaller than a pressure driven separation system used to desalinate water to produce water suitable for improved oil recovery methods. In accordance with aspects and embodiments, the footprint of the electrically-driven system discussed herein may be reduced by decreasing the membrane surface areas of the separation apparatuses in the system. The reduced footprint may increase the system energy consumption. However, the system may advantageously employ the natural gas produced as a result of oil recovery methods. Because natural gas is available in excess at oil recovery sites, the throughput of the electrically-driven separation apparatus can be maintained despite the increased energy demand that results from the reduction in the system's footprint. By allowing the system to operate less efficiently and consume more energy per unit treated water, the footprint of the system can be reduced. The reduced footprint may reduce the cost associated with water flooding recovery, particularly when the systems and methods are employed on off-shore oil platforms where space is at a premium and sources of energy are in excess.

In accordance with one or more embodiments, the electrically-driven separation apparatuses and systems may desalt warm desalination water without degradation in product quality. In pressure driven separation systems, as the temperature of the feed increases, salt passage through the membrane decreases and reduces product quality. Warmer feed water temperatures also accelerate the rate of pressure driven membrane degradation. Generally, feed water treated by pressure driven separation methods must have a temperature of lower than about 35° C. to about 45° C. to ensure product quality and membrane stability. The ion exchange membranes of the electrically-driven separation apparatuses and systems of the present embodiments may have a higher thermal stability than pressure driven separation membranes and may operate on feed waters having elevated temperatures, for example temperatures in the range of from about 1° C. to about 99° C. An increased feed temperature may advantageously reduce the amount of energy consumed by apparatuses and systems of the present embodiments. Because high temperature feeds reduce the voltage drop across electrochemical cells, the system capacity of an electrically-driven separation apparatus may be increased while maintaining constant energy consumption. Furthermore, the apparatuses and systems may, as a result of the enhanced efficiency of the apparatuses and systems when operating on higher temperature feeds, be kept at a constant energy demand while reducing the exchange membrane surface area and system footprint.

Figure 3:
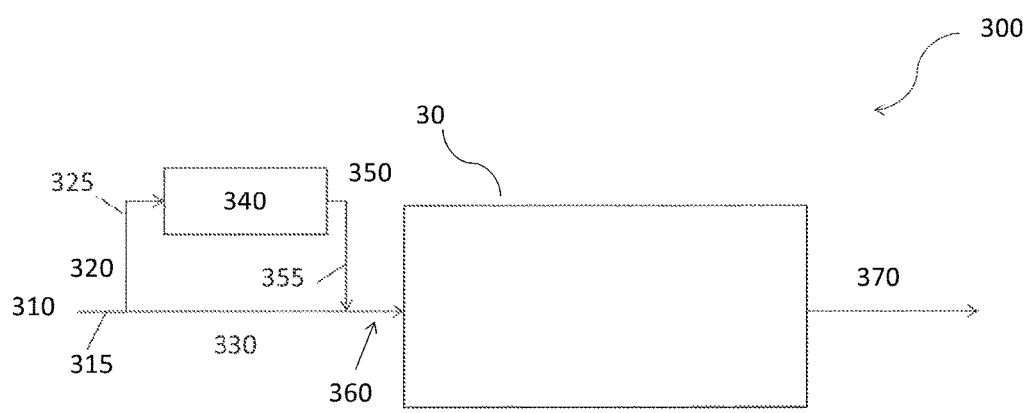
FIG. 3 presents a schematic of a high-temperature electrically-driven separation system in accordance with one or more embodiments.

Referring to FIG. 3, system 300 comprises electrically-driven subsystem 30 in accordance with one or more embodiments. System 300 comprises a source of waste heat 340 upstream of subsystem 30. A feed of pretreated desalination water 310 is introduced into conduit 315 and split into portion 320 and portion 330. Conduit 325 receives portion 320 of desalination water 310. Conduit 325 thermally couples portion 325 to a source of waste heat 340, which increases the temperature of portion 320. Heated desalination water 350 is then introduced into conduit 355. Conduit 355 has an outlet in fluid communication with conduit 315 and heated desalination water 350 is introduced into conduit 315 and combines with portion 330 of desalination water to produce warm desalination water 360. Conduit 315 then introduces warmed desalination water 360 into electrically-driven separation apparatus 30. The increased temperature of desalination water 360 as compared to desalination water 310 may advantageously reduce the energy required to produce treated water 370. The increase in temperature of desalination water 360 reduces the electrical resistance of the membranes in the electrically-driven separation apparatuses and thus reduces the voltage drop across the cells of the separation system 30. The reduced voltage drop may enable system 30 to accommodate a higher throughput of feed without an increase in energy consumption. Alternatively, the size of system 30 may be reduced while maintaining a constant energy consumption without degradation of product quality.

Source of waste heat 340 may be generated by a generator, a steam condenser of a power plant, a boiler, excess heat from a gas flare, or any other source of waste heat. The ability of the disclosed systems and methods to treat desalination water of higher temperatures is particularly advantageous because power plants, oil platforms, and other systems generally have a plurality of unit operations that generate waste heat and must be cooled. Power plants, for example, are often built near a source of desalination water to provide the plant with an excess of cooling water. The desalination water used to cool the unit operations becomes hot. Water used to cool steam condensers, for example, after one pass cooling may generally have a temperature of about 10° C. to about 50° C. There are strict regulations, however, on the temperature at which water can be discharged back into the environment. High temperature water may disturb marine life and adversely impact the surrounding ecosystem. Water used for cooling must then be cooled to a suitable temperature before it can be discharged. This additional step of cooling the water can contribute to capital and operating costs.

For example, desalination water used to cool on-board generators on an off-shore oil platform must be cooled before the water can be discharged or used in a pressure driven separation system. Cooling requires additional equipment that occupies valuable space on the platform. In accordance with one or more embodiments, desalination water used to cool on-board generators may be directly fed to an electrically-driven separation system to produce flooding water. The need to pass hot water through cooling equipment may thus be eliminated. One or more embodiments may be able to treat desalination water having temperatures in the range of from about 1° C. to about 99° C. In some non-limiting embodiments, desalination water at a temperature in the range of about 20° C. to about 60° C. about may be treated. As temperature of the feed increases, the energy and membrane area required to desalt seawater decrease. The increased temperature of feed water may therefore reduce the system energy consumption and/or may enable the footprint of the electrically-driven separation system to be reduced, which may result in substantial economic savings over traditional systems and methods used to produce treatment water for improved oil recovery.

Likewise, a power plant may be coupled to an electrically-driven separation system to provide power and potable water to the area it services. The plant may use a source of desalination water to cool certain unit operations that generate waste heat and then feed the desalination water having an elevated temperature to an electrically-driven separation system in accordance with one or more embodiments. The increased temperature of the water may enable the electrically-driven separation system to consume less energy for a certain product flow rate than would otherwise be possible. An electrically-driven separation apparatus may, for example, be able to accommodate a 3.2% increase in flux for every 1° C. increase in feed temperature.

In accordance with one or more embodiments, water used for cooling, such as water used to cool an engine (e.g. an internal combustion engine), may be blended with seawater to achieve a desalination water at a desired temperature rather than being directly fed to an electrically-driven separation system. Thus, cooling water at an elevated temperature may be blended with seawater to achieve water within a desired temperature range, for example, between about 20° C. and about 60° C., for subsequent desalination by an ED or other device.

In accordance with one or more embodiments, the electrically-driven separation systems may treat water having naturally elevated temperatures, for example, natural water from a deep well. Some natural waters may have a temperature of over about 50° C. and thus must be cooled before treated by a pressure driven separation system. The systems and methods in accordance with one or more embodiments may treat naturally occurring high temperature desalination water without an intermediate cooling step and may, as a result of the high feed temperature, advantageously be able to reduce the energy consumption per unit of treated water produced.

When water temperature is higher, the solubility of calcium sulfate becomes lower, thus increasing the risk of scaling. Bio-growth and membrane degradation may also be accelerated. High temperature desalination can be improved by taking appropriate measures to mitigate scaling and bio-growth. The solubility of calcium compounds can be controlled with the addition of an antiscalant and bio-growth can be controlled by periodic disinfection of the desalination equipment with a disinfectant such as chlorine, chlorine dioxide, or a high temperature flush of the equipment at a temperature of more than about 80° C. Bio-growth can also be controlled by either periodic or continuous introduction of a disinfectant to the feed water of the desalination system. Thermal stability tests have demonstrated that the membranes which may be used in one or more embodiments are not degraded by higher temperature feed waters, for example, desalination water at a temperate of more than about 50° C.

Systems and methods in accordance with one or more embodiments may operate at pressures in the range of from about 140 kPa to about 420 kPa or higher. The lower system pressures as compared to traditional pressure driven separation systems may allow for the use of lighter-weight, corrosion-resistant, materials, for example, PVC piping, fiberglass piping, or lightweight lined steel piping. Furthermore, smaller, lighter weight and less expensive pumps can be used. Noise and vibration may be reduced. Safety may also be enhanced.

In some embodiments, an electrically-driven separation subsystem may have modular components that enable the system to be modified for given processes. For example, a modular electrically-driven separation subsystem may be capable of multiple configurations. In a first configuration, the subsystem may produce a treated water suitable for secondary oil recovery. In the first configuration, the subsystem may comprise at least two electrodialysis units fluidly connected in parallel. One of the electrodialysis units may comprise standard anion and cation exchange membranes, and another of the units may comprise a standard anion exchange membrane and monovalent cation exchange membrane. After oil recovery by secondary methods has been exhausted, the subsystem may be configured in a second configuration to produce a treated water suitable for tertiary recovery. Water suitable for tertiary recovery generally has the same composition of water used in secondary recovery, with the exception that as much hardness is removed from the tertiary water as possible. The electrodialysis unit having a monovalent cation exchange membrane may be replaced by an electrodialysis unit having standard anion and cation exchange membranes. Both electrodialysis units may then function to remove divalent ions such as hardness and sulfate. In the second configuration, the electrically-driven subsystem may produce water having a total dissolved solids content in the range of from about 1000 ppm to about 5000 ppm, less than about 200 mg/l sulfate, and less than 400 ppm hardness. In accordance with some embodiments, the subsystem may produce a treated water having less than about 100 mg/l sulfate, for example less than about 40 mg/l sulfate, and less than about 1000 ppm of hardness, for example less than about 500 ppm hardness.

In accordance with some embodiments, one or more electrically-driven separation apparatuses can be added or removed from the system. Apparatuses may be fluidly connected in parallel, series, or both depending on the treated water desired. The electrically-driven separation subsystem may have skid mounted electrically-driven separation apparatuses. When a system modification is required, a skid having a first electrically-driven separation apparatus may be exchanged for a skid having a second electrically-driven separation apparatus. The second electrically-driven separation apparatus may have the same properties as the first electrically-driven separation apparatus and may simply replace the first apparatus in the event that the first apparatus requires service, or, the second electrically-driven separation apparatus may have different properties than the first apparatus and may be exchanged in order to produce a desired treatment water not capable of being produced by a system having the first apparatus.

Desalination water treated by the systems and methods disclosed herein may be tuned to produce a treated water having desired properties. For example, a treated water having a desired hardness may be produced by adjusting the portions of desalination water fed to electrically-driven separation apparatuses having different membranes. If more hardness is desired, a larger portion of a feed stream may be fed to an electrically-driven separation apparatus having monovalent cation exchange membranes. If less hardness is desired, a larger portion of a feed stream may be fed to an apparatus having standard cation exchange membranes such that a larger portion of the total treated water has passed through divalent-selective membranes.

The treated water can further be tuned by adjusting the voltage applied to one or more electrically-driven separation apparatuses in the subsystem. If a treated product water having a specific purity is desired, an appropriate voltage may be applied to the system to achieve the requisite level of removal. When the system has at least two apparatuses arranged parallel, the voltage applied to a module can be adjusted without modifying the voltage applied to other apparatuses. Applied voltage can therefore also be adjusted to produce water having a specific hardness. The treated water can also be tuned in response to fluctuations in feed temperature and composition, or in response to any other system parameter.

In some embodiments, a controller may facilitate or regulate the operating parameters of the electrically-driven separation subsystem. For example, a controller may be configured to adjust the feed of desalination water fed to the subsystem, adjust the portions of desalination water fed to individual electrically-driven separation apparatuses within the system, adjust the voltage applied to individual electrically-driven separation apparatuses within the system, and/or other parameters associated with any of the unit operations of the electrically-driven separation subsystem. In electrically-driven separation systems having electrically-driven separation apparatuses arranged in parallel, the controller may adjust the operating conditions of one electrically-driven separation apparatus without changing the operating conditions of other electrically-driven separation apparatuses, the controller may uniformly adjust the operating parameters of all electrically-driven separation apparatuses in the system, or may adjust the operating parameters of individual units in the system in a non-uniform manner.

The controller may respond to signals from timers and/or sensors positioned at any particular location within the treatment system. One or more sensors may monitor one or more operational parameters such as desalination water temperature, desalination water composition, characteristics of product waters from one or more electrically-driven separation apparatuses in the electrically-driven separation subsystem, and/or one or more characteristics of treatment water produced by the subsystem.

For example, one or more sensors may be placed at an inlet of an electrically-driven separation system. A thermocouple may measure the temperature of the incoming desalination water and send a signal to at least a portion of the electrically-driven separation subsystem to adjust the voltage applied in an electrically-driven separation apparatus of the subsystem in response to a change in feed temperature. Likewise, an amperometric probe may measure the measuring the conductivity of the feed as a measure of total dissolved solids and send a signal to at least a portion of the electrically-driven separation subsystem to adjust the voltage applied in an electrically-driven separation apparatus of the subsystem in response to a change in total dissolved solids concentration in the feed.

One or more sensors may be placed at the outlet of the electrically-driven separation system to measure properties of the treated water. For example, a probe having a hardness selective membrane positioned between the electrodes may be placed at an outlet of the electrically-driven separation system to measure the concentration of hardness in the treated water as a function of conductivity. The probe may send a signal to one or more valves upstream of one or more electrically-driven separation apparatuses in the subsystem. The signal may cause a larger portion of the desalination water to be fed to an electrically-driven separation apparatus having standard anion and cation exchange membranes such that the treated water has less hardness. The signal may instead cause a larger portion of the desalination water to be fed into an electrically-driven separation apparatus having a monovalent cation exchange membrane such that the treated water has a higher concentration of hardness.

In some embodiments, the portions of flow to electrically-driven apparatuses in the subsystem and/or the voltages applied to these apparatuses may be adjusted to maintain a constant treatment water composition. In some embodiments, parameters may be adjusted to instead maintain a constant energy consumption. The system and controller of one or more embodiments provide a versatile unit having multiple modes of operation, which can respond to multiple inputs to tune the treated water and/or increase the efficiency of the system.

The controller may be implemented using one or more computer systems which may be, for example, a general-purpose computer such as those based on an Intel PENTIUM® or Core® processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements one or more embodiments can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, for example, between components that are integrated within a same device, and/or a network, and/or between components that reside on separate discrete devices. The interconnection mechanism may enable communication of, for example, data and/or instructions, to be exchanged between components of the system. The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments, the one or more input devices may include sensors for measuring any one or more parameters of any of the embodiments of systems disclosed herein and/or components thereof. Alternatively, the sensors, metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller can be performed in separate computers, which can be in communication with one another through one or more networks.

Feed back control may be used in some embodiments of the control system. One or more sensors or meters for measuring any one or more of temperature, total dissolved solids (TDS), hardness, sulfate, and/or other parameter(s) of interest may be utilized to measure one or more characteristics of product waters leaving one or more electrically-driven separation apparatuses within the electrically-driven separation subsystem, or treated water leaving the subsystem and supply the controller with an information regarding these one or more characteristics. When any of measured characteristics changes, the controller may react by causing the system to adjust various operating parameters, for example, flow rates to any of the unit operations, voltage applied to any of the unit operations, power consumed by any of the unit operations, power consumed by the subsystem, or any other desired operating parameter of the subsystem.

Feed forward control may be utilized in some embodiments of the control system. One or more sensors or meters for measuring any of temperature, total dissolved solids (TDS), hardness, sulfate, and/or other parameter(s) of interest may be utilized to measure one or more characteristics of the desalination water entering the subsystem (or at any other location within the system) and supply the controller with information regarding these one or more parameters. Depending on the levels of any one of the measured parameters of the desalination water, the controller may cause the system to adjust various operating parameters, for example, for example, flow rates to any of the unit operations, voltage applied to any of the unit operations, power consumed by any of the unit operations, power consumed by the subsystem, or any other desired operating parameter of the subsystem.

Further aspects may involve or be directed to computer-readable media, or providing computer-readable media, that facilitates the various features of the treatment approaches described herein.

For example, the computer-readable media can comprise instructions implementable on a computer system or a controller that performs a method of treating water in a water treatment system in accordance with any one or more of the embodiments described above.

In other configurations, the computer-readable media can comprise instructions implementable on a computer system or a controller that performs a method of facilitating the treatment of desalination water to produce a treated water suitable for water flooding an oil reservoir. The desalination Water may comprise a source of pretreated seawater and the method may comprise introducing the desalination water into an electrically-driven separation subsystem. The subsystem may include a plurality of electrically-driven separation apparatuses. The electrically-driven separation apparatuses may be connected in parallel, in series, or some combination thereof. The method may include introducing a portion of the desalination water into one electrically-driven separation apparatus to produce a product water, introducing another portion of the desalination water intro another electrically-driven separation apparatus in parallel with the first apparatus to produce a second product water, and combining the two product waters to generate a treated water. At least one of the plurality of electrically-driven separation apparatuses of the subsystem may have monovalent cation selective membranes. The method may further comprise first heating the desalination water with a source of waste heat.

The modifications and enhancements may be used individually, or in combination. Existing desalination systems and existing improved oil recovery systems may be retrofitted by providing and implementing the modifications discussed herein in accordance with one or more embodiments. For example, an existing improved oil recovery system may comprise a reverse osmosis unit having an inlet fluidly connected to a source of desalination water and an outlet in fluid communication with an oil reservoir. The reverse osmosis unit may be on a skid. The skid supporting the reverse osmosis unit may be replaced by an electrically-driven separation system in accordance with the present disclosure. An improved oil recovery system may comprise a reverse osmosis unit and a nanofiltration unit. Rather than replacing the nanofiltration unit, an electrically-driven separation subsystem may be retrofitted on the platform in place of the reverse osmosis unit, downstream of and in fluid communication with the nanofiltration unit. The nanofiltration unit may pretreat desalination water such that the electrically-driven separation system can have a substantially reduced footprint and the entire oil recovery system can have a footprint equal to or less than the reverse osmosis-nanofiltration system. Improved oil recovery systems retrofitted with the electrically-driven systems and methods may benefit from the ability to tune the quality of the treated water in response to changes in the system.

In accordance with one or more embodiments, desalination systems and methods discussed herein may be used for offshore oil recovery. In accordance with one or more other embodiments, desalination systems and methods discussed herein may be used in an oil field on or near the mainland. In accordance with still one or more further embodiments, desalination systems and methods discussed herein may be used in connection with any floating or mobile vessel, such as those which may be dedicated to providing support services for oil platforms.

Existing power plants may also be fitted with desalination systems able to produce potable water at lower energy than traditional desalination systems by providing and implementing the modifications discussed herein in accordance with one or more embodiments. Because power plants do not generally encounter the same space restrictions of offshore platforms, an electrically-driven separation system in accordance with one or more embodiments can have a larger footprint for the purposes of reducing the system energy consumption. The systems and methods disclosed herein may produce potable water from desalination water used to cool power plant unit operations at a reduced energy consumption as compared to treating cooler desalination water. In accordance with one or more embodiments, water at an elevated temperature, whether natural or warmed such as by use for cooling, may be treated with the disclosed systems and methods to generate a product water meeting the requirements of various applications, such as to produce water for flooding, potable water, agricultural water and others.

The function and advantages of these and other embodiments can be further understood from the examples below, which illustrate the benefits and/or advantages of the one or more systems, methods, and techniques but do not exemplify the full scope of the invention.

Example 1

A water injection pressure driven separation system operating on an off-shore oil platform was evaluated to generate a benchmark to which the systems and methods of the present invention could be compared.

Figure 4:
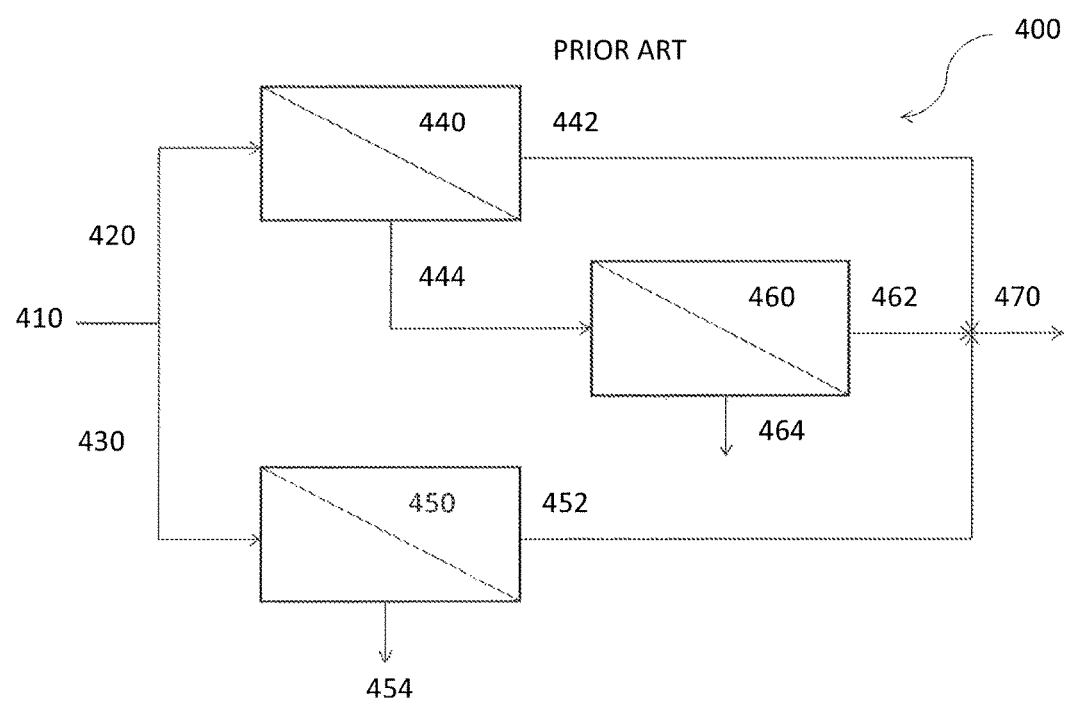
FIG. 4 presents a process diagram of a traditional improved oil recovery system described in accompanying Example 1.

Referring to FIG. 4, the system of the site study, system 400, comprised nanofiltration unit 440, nanofiltration unit 460, and reverse osmosis unit 450. A feed of pretreated desalination water 410 was split into portions 420 and 430. Portion 420 of desalination water 410 was directed to nanofiltration unit 440. Nanofiltration unit 440 produced permeate 442 and retentate 444. Retentate 444 was then directed to nanofiltration unit 460. Nanofiltration unit 460 produced permeate 462 and retentate 464. Retentate 464 was discarded. Portion 430 of desalination water 410 was introduced into reverse osmosis unit 450. Reverse osmosis unit 450 produced permeate 452 and retentate 454. Retentate 454 was discarded. Permeates 442, 462, and 452 were blended to produce product water 470. Table 1 shows the compositions of pretreated desalination water 510, blended nanofiltration permeates 442 and 462, reverse osmosis permeate 452, and blended product 470.

TABLE 1

| Species of concern | Pretreated Seawater (410) | Nanofiltration Product (442 + 462) | Reverse Osmosis Product (452) | Blended Product (470) |
|---|---|---|---|---|
| TDS (mg/l) | 35095 | 16364 | 278 | 5000 |
| $SO_4^{2-}$ (mg/l) | 2712 | 37 | 2.25 | <30 |
| Hardness (mg/l) | 6315 | 1365 | 13 | <50 |

Because the reverse osmosis product 452 contained about 13 mg/l hardness, it had to be remineralized with a source of hardness, such as nanofiltration products 442 and 462. In order to arrive at a product having the properties of Table 1, approximately 70% of the blended product water consisted of reverse osmosis water 452 and the remaining percentage consisted of nanofiltration water. The desalination water was a source of pre-treated seawater having a total dissolved solids content of 35,095 mg/l and a temperature of 4° C. The system throughput was approximately 12.0 MGD (million gallons per day) and the system operated at approximately 48% water recovery to produce about 5.8 MGD. The system consumed about 3.0 kWh/m³ product water and had a footprint of 18.5 m².

Example 2

A study was conducted to evaluate the viability of electrically-driven separation systems for use on off-shore oil platforms to produce a water suitable for improved oil recovery methods. The goal composition of the treated water was 1000 ppm to about 5000 ppm TDS, less than about 40 mg/l $SO_4^{2-}$, and a hardness concentration of less than about 400 mg/l. The results discussed herein represent modeled projections based on experimental data.

Figure 5:
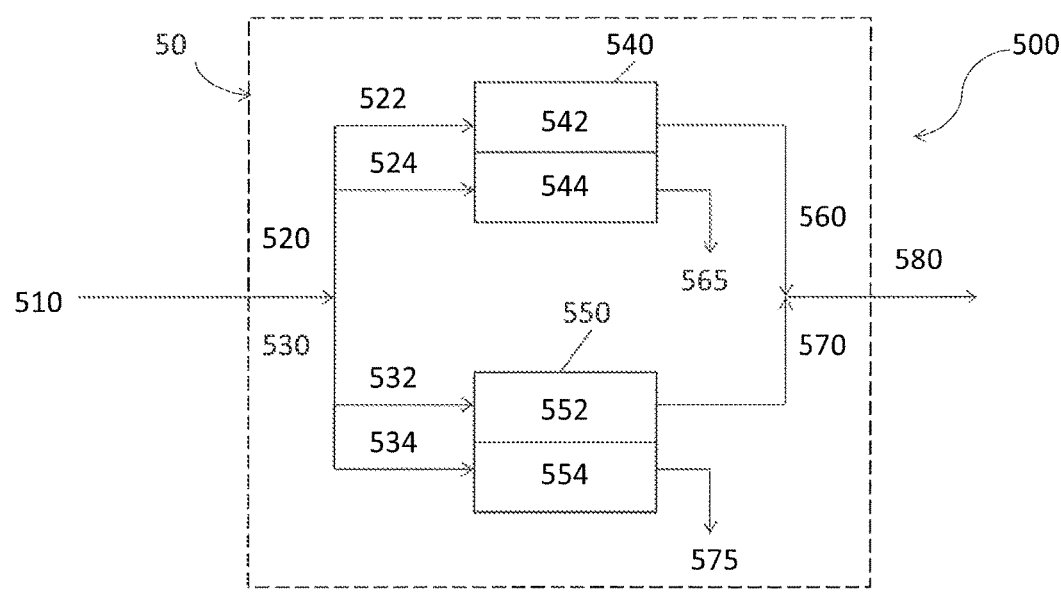
FIG. 5 presents a process diagram of an improved oil recovery system comprising an electrically-driven separation subsystem discussed in accompanying Examples 2 and 3 in accordance with one or more embodiments.

Referring to system 500 of FIG. 5, a feed of pretreated desalination water 510 was introduced into electrically-driven separation subsystem 50. Subsystem 50 included electrodialysis unit 540 having diluting cell 542 and concentrating cell 544. Electrodialysis unit 540 comprised standard anion and cation exchange membranes. Subsystem 50 also included electrodialysis unit 550 having diluting cell 552 and concentrating cell 554. Unit 550 had a standard anion exchange membrane and a monovalent selective cation exchange membrane.

A feed of desalination water 510 pretreated via particulate removal and disinfection was introduced into subsystem 50 and split into portion 520 and portion 530. Portion 520 of desalination water 510 was further split into stream 522 and stream 524. Stream 522 was introduced into diluting cell 542 of electrodialysis unit 540 and stream 524 was introduced into concentrating cell 544 of electrodialysis unit 540. Electrodialysis unit 540 produced concentrated stream 565 and diluted stream 560. The standard anion and cation exchange membranes of unit 540 removed substantially all of the hardness and sulfate from stream 522 to generate a product stream 560 having more monovalent than divalent ions. Sodium, however, accounts for the majority of dissolved solids present in seawater and is a monovalent ion not preferentially removed by the standard ion exchange membranes of unit 540. Though product 560 had low hardness and sulfate, it still contained a relatively high concentration of total dissolved solids.

Portion 530 of desalination water 510 was further split into stream 532 and stream 534. Stream 532 was introduced into diluting cell 552 of electrodialysis unit 550 and stream 534 was introduced into concentrating cell 554. Electrodialysis unit 550 produced concentrated stream 575 and diluted stream 570. The standard anion exchange membrane of unit 550 removed substantially all of the sulfate from stream 532. The monovalent cation exchange membrane of electrodialysis unit 550 removed substantially all the monovalent cations from stream 532 but did not remove the divalent cations present in stream 532. Stream 570 thus had a low total dissolved solids content and a high hardness concentration due to the removal of only monovalent cations and a low sulfate concentration due to the presence of the standard anion exchange membrane. Concentrated streams 565 and 575 were rejected and diluted product streams 560 and 570 were combined to form treated water 580.

When portion 520 of desalination water 510 comprised 90% of desalination water 510, and portion 530 of desalination water 510 comprised 10% of desalination water 510, and the system operated at 40% water recovery, treated water 580 had a sulfate content of less than about 40 mg/l, a total dissolved solids content of about 1000 ppm to about 5000 ppm, and a hardness concentration of about 400 mg/l. The composition of the water was dependent on the system power consumption. When the system was sized to have a footprint equal to that of the reverse osmosis-nanofiltration system of Example 1 and tuned to produce water having a total dissolved solids content of less than about 5000 ppm, a sulfate content of less than about 40 mg/l, and about 400 ppm of hardness, the system was able to produce more treated water than the system of Example 1 by consuming about 2.5 kWh/m³ treated water, 17% less energy than consumed by the system of Example 1.

Example 3

Figure 6:
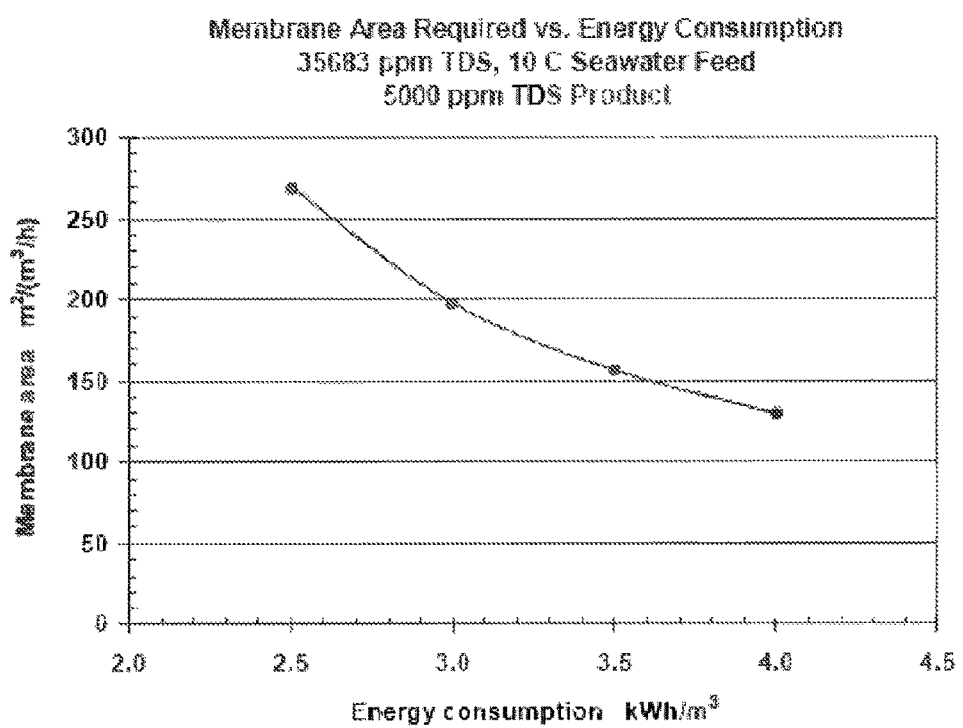
FIG. 6 presents data discussed in accompanying Example 3 in accordance with one or more embodiments.

The system of Example 2 was analyzed to determine the relationship between membrane surface area and energy consumption. Desalination water having 35,683 TDS at 10° C. was treated to produce a treated water having less than about 5000 ppm TDS and hardness and sulfate concentrations suitable for water flooding. FIG. 6 shows that as the membrane surface area was decreased and the treated water composition was held constant, the power consumption increased. Table 2 presents the relationship between the reduction in the system footprint as compared to the system of Example 1 and energy consumption.

TABLE 2

| Electrically-driven Separation System Energy Consumption | Reduction in System footprint as compared to Footprint of NF + RO System with Energy Consumption of 3.0 kWh/m³ | |
|---|---|---|
| (kWh/m³) | (m²)* | (%) |
| 2.5 | 0 | 0 |
| 3.0 | 18.75 | 22.7 |
| 3.5 | 27.75 | 33.6 |
| 4.0 | 36.75 | 44.5 |

*One square meter of space on an offshore oil platform costs approximately $1M.

Example 4

Figure 7:
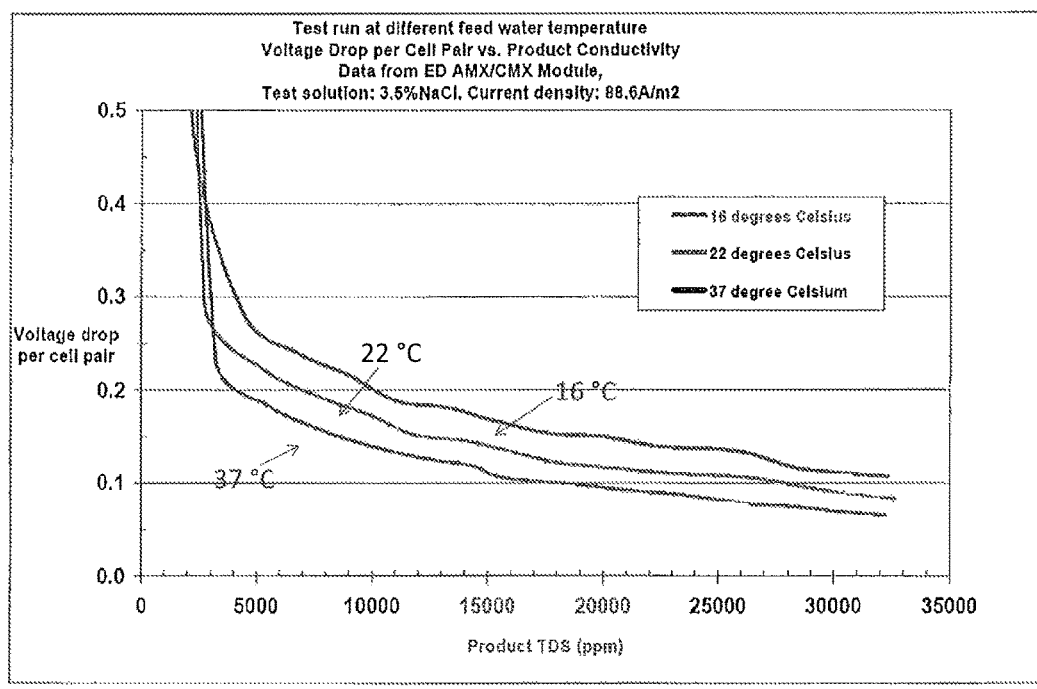
FIGS. 7-12 present data discussed in accompanying Example 4 in accordance with one or more embodiments.

A lab-sized electrodialysis module having standard anion and cation exchange membranes was assembled to analyze the energy savings associated with desalting hot desalination water. The module had 16 cell pairs with membranes having an effective cross-sectional area of 3.18 cm² by 35.56 cm². A test solution of 3.5 wt % sodium chloride was desalted with an applied current density of 88.6 Amp/m². The voltage drop of the module was measured using platinum foil tabs inserted into the middle 10 cell pairs. Desalting experiments were carried out at three different temperatures: 16° C., 22° C., and 37° C. FIG. 7 illustrates the relationship between voltage drop per cell pair and the dilute stream outlet conductivity. The experimental data demonstrated that the voltage drop per cell pair decreased when the feed solution temperature increased.

Figure 8:
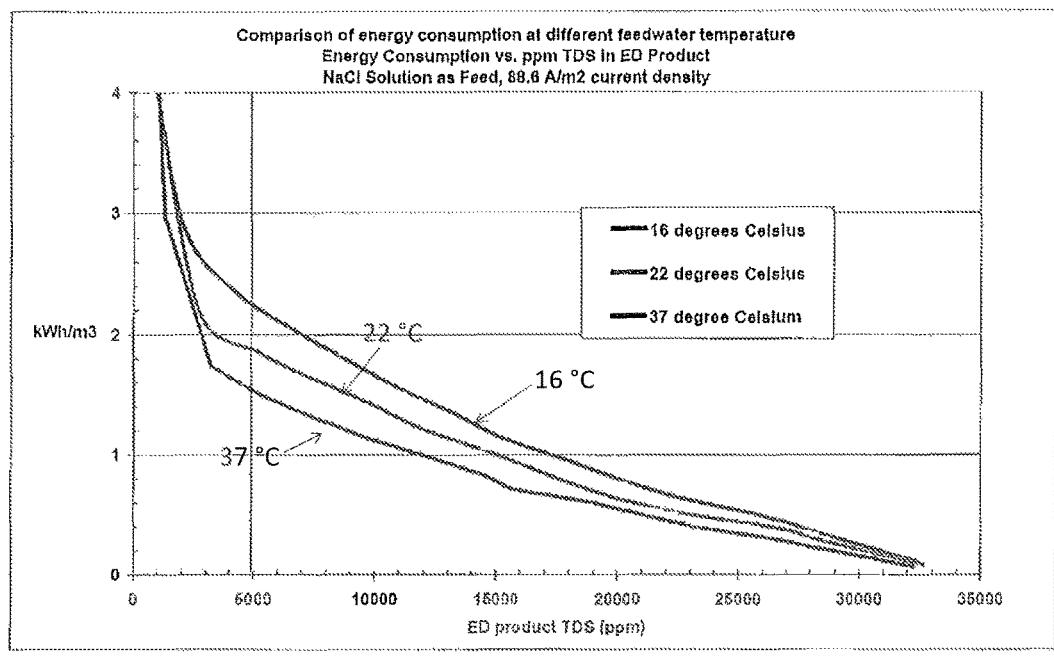
Figure 9:
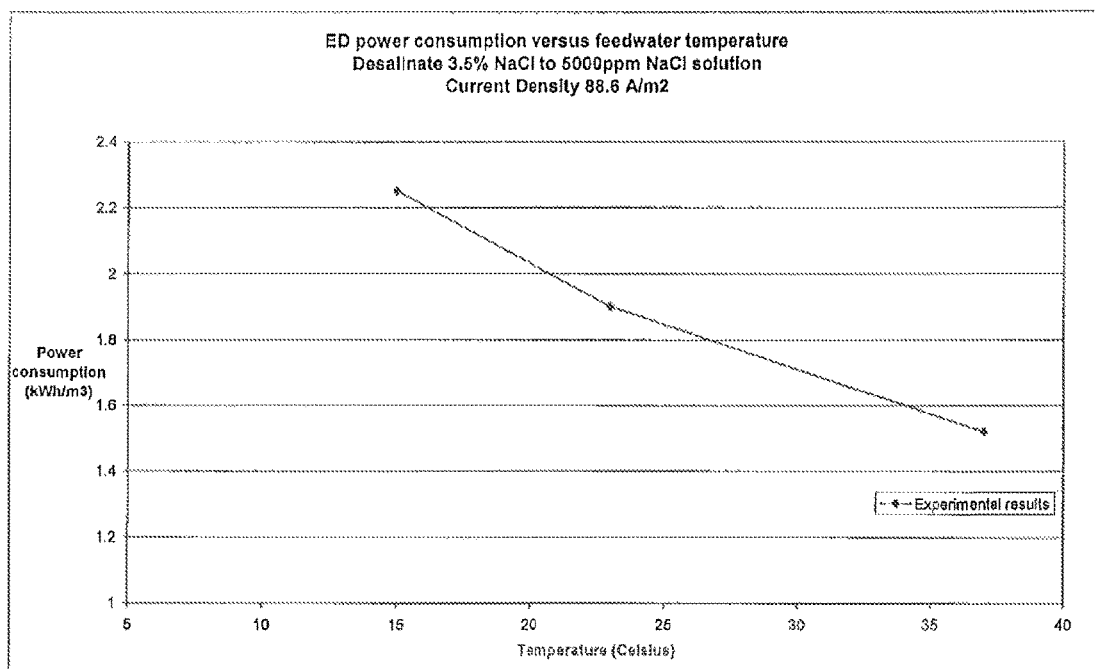

FIGS. 8 and 9 illustrate the accumulated energy consumption during desalination. Feeds of 3.5% NaCl solution having varying temperatures were desalted to a TDS of about 5000 ppm. As the feed temperature increased, the energy consumption decreased.

Figure 10:
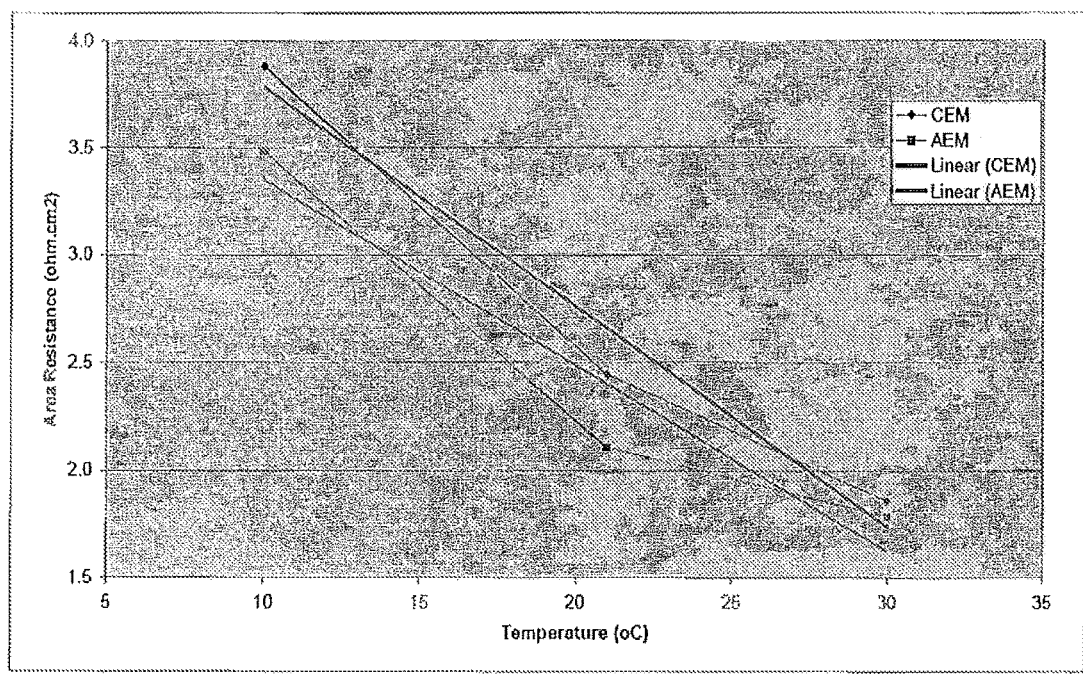

FIG. 10 illustrates the relationship between feed temperature and membrane resistance. As feed temperature increased, the electrical resistance of both the cation and anion exchange membranes decreased. The reduction in electrical resistance of the membranes resulted in a lower voltage drop across the cells, which translated to the decreased energy consumption seen in FIGS. 8 and 9.

Figure 11:
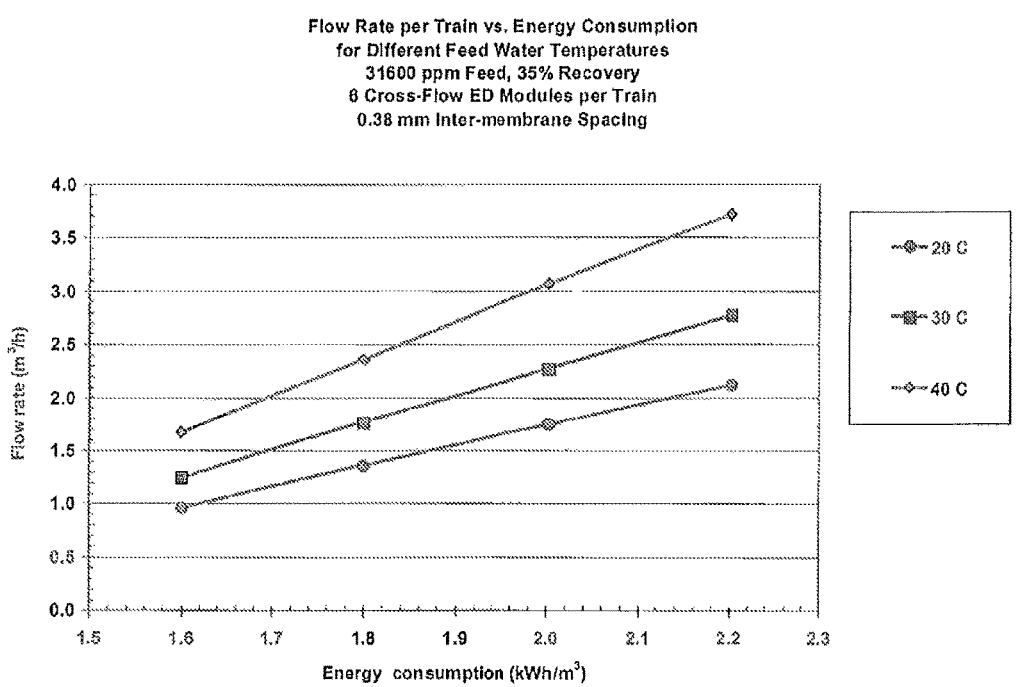

The relationship between system capacity and feed temperature was then analyzed. Referring to FIG. 11, as the feed temperature increased, current density and flow rate were increased while maintaining the system at a constant energy consumption. At an energy consumption of 2.2 kWh/m³, the flow rate, or capacity, could increase 75% with feed water temperature increasing from 20° C. to 40° C., or 3.2% per degree Celsius, referring to the value at 25° C.

Figure 12:
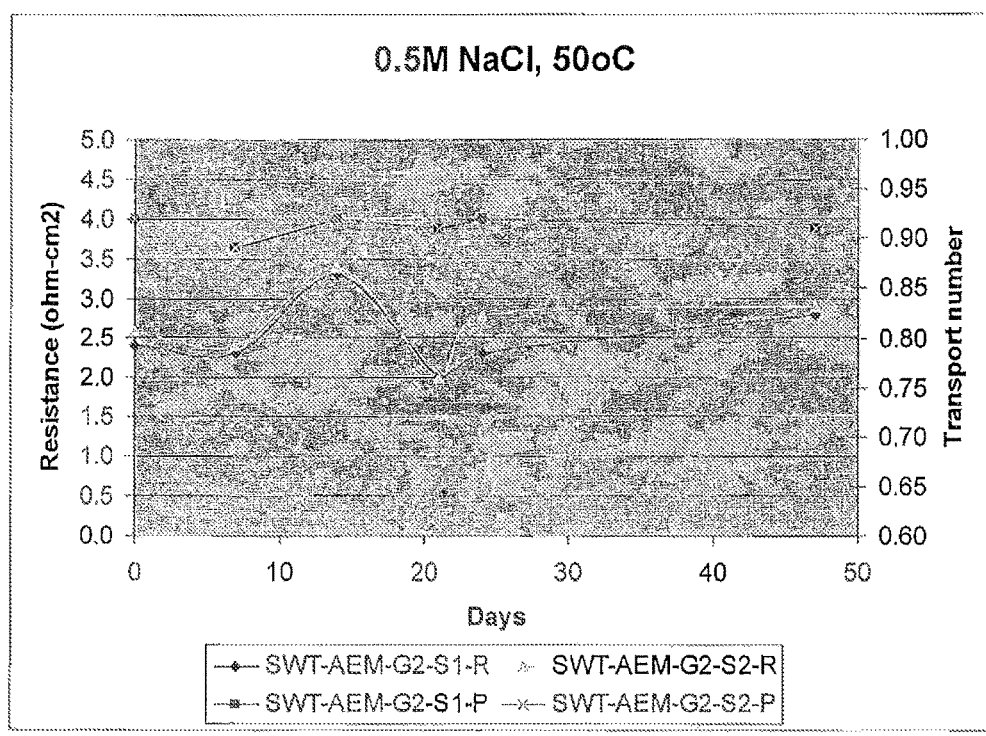

The thermal stability of the anion and cation exchange membranes used in the cells was assessed to determine if increased feed temperatures caused membrane degradation. The membranes were exposed to a 0.5M sodium chloride solution at 50° C. After 50 days of continuous exposure, the membrane transport number and resistance appeared to be stable. FIG. 12 illustrates the results of membrane stability tests on ion exchange membranes. The results indicated that the membranes could desalt warm desalination water without resulting in accelerated membrane degradation.

Example 5

Figure 13:
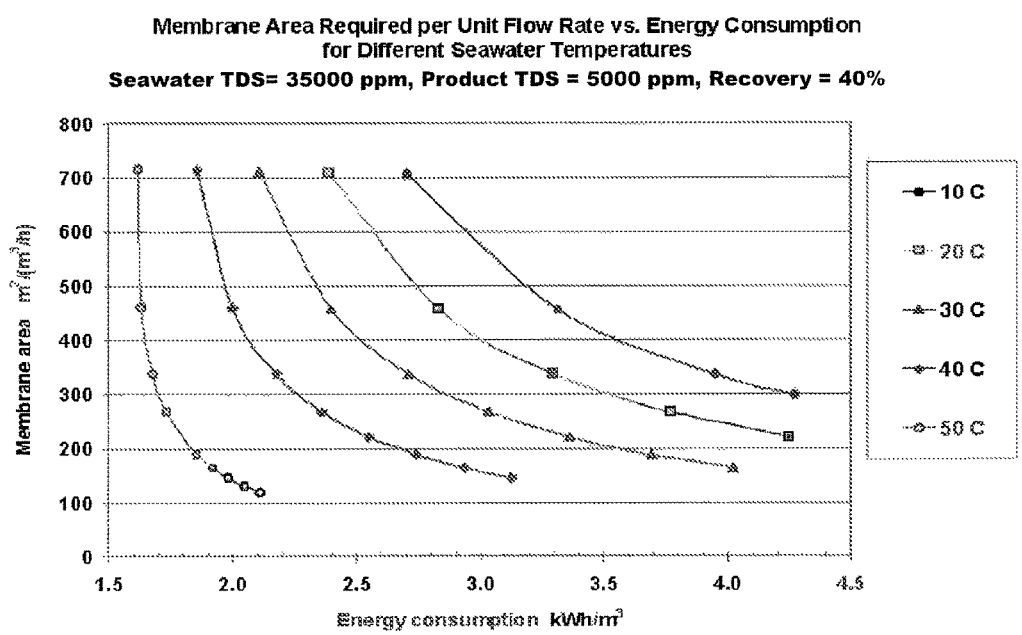
FIG. 13 presents data discussed in accompanying Example 5 in accordance with one or more embodiments.

FIG. 13 shows the relationship between temperature, energy consumption, and membrane area required to desalt seawater to a total dissolved solids concentration of 5000 ppm. The effect of seawater temperature on the tradeoff between membrane area required per unit product flow rate (and therefore the capital cost of the ED system per unit flow rate) and energy consumption per unit volume of product was demonstrated. If the raw seawater temperature was 10° C., and waste heat were available to raise its temperature, then for a given target energy consumption (kWh/m3 of product) the capital cost of the system required would decrease as the temperature increases. Conversely if the ED system was designed for a given flow rate, so that the capital cost per unit flow rate were fixed, it was demonstrated that increasing the feed water temperature would decrease the energy consumption.

It is to be appreciated that embodiments of the systems, apparatuses and methods discussed herein are not limited in application to the details of construction and the arrangement of the apparatus components and system operations as set forth in the above description or illustrated in the accompanying drawings. The apparatuses, systems and methods are capable of implementation in other embodiments and of being practiced or of being carried out in various ways. Examples of specific implementations are provided herein for illustrative purposes only and are not intended to be limiting. In particular, systems, apparatuses and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method for improved oil recovery, comprising:
introducing seawater to an electrically-driven separation system comprising a first electrodialysis apparatus including monovalent selective membranes and a second electrodialysis apparatus including divalent selective membranes;
measuring at least one parameter of the seawater selected from the group consisting of composition, total dissolved solids concentration, sulfate concentration, and hardness, at an inlet of the electrically-driven separation system;
selectively passing a first portion of the seawater through the first electrodialysis apparatus and a second portion of the seawater through the second electrodialysis apparatus for treatment based on the measured parameter to produce first and second product streams, respectively, such that the first product stream has a greater concentration of hardness than the second product stream;

blending the first and second product streams to produce treated water including less than about 200 mg/l of sulfate, having a total dissolved solids (TDS) content in the range of about 1000 mg/l to about 5000 mg/l, and having a hardness level in the range of about 100 ppm to about 1000 ppm without blending or remineralizing the treated water with a source of hardness; and flooding at least a portion of an oil reservoir with the treated water.

2. The method of claim 1, wherein the treated water includes less than about 100 mg/l of sulfate.

3. The method of claim 2, wherein the treated water includes less than about 40 mg/l sulfate.

4. The method of claim 1, further comprising heating the seawater prior to introducing the seawater to the electrically-driven separation system.

5. The method of claim 4, wherein heating the seawater comprises transferring waste heat from a generator to the seawater.

6. The method of claim 4, wherein the seawater is heated to a temperature above about 45° C.

7. The method of claim 1, wherein passing the first portion of seawater through the first electrodialysis apparatus comprises passing about 90% of the seawater to be treated through the first electrodialysis apparatus.

8. The method of claim 1, wherein flooding at least a portion of the oil reservoir with the treated water comprises removing about 10% to about 15% of oil left in place following a primary oil recovery operation.

9. The method of claim 1, further comprising performing a tertiary oil recovery operation.

10. The method of claim 1, further comprising adjusting a flow rate or a current density associated with the electrically-driven separation system to control energy consumption or at least one property of the treated water.

11. The method of claim 1, comprising introducing seawater having a concentration of TDS of about 35,000 ppm, a sulfate concentration of about 2700 ppm as $SO_4$, and a hardness of about 6500 ppm as $CaCO_3$ to the electrically-driven separation system.

12. The method of claim 1, comprising introducing seawater to an electrically-driven separation system comprising a first electrodialysis apparatus and a second electrodialysis apparatus fluidly connected in parallel.

13. A secondary oil recovery system, comprising:
an oil reservoir;
a source of seawater;
an electrically-driven separation subsystem installed on an offshore platform, having:
an inlet fluidly connected to the source of seawater;
an outlet fluidly connected to the oil reservoir;
a first electrodialysis unit including monovalent selective membranes; and
a second electrodialysis unit including divalent selective membranes,
the electrically-driven separation subsystem constructed and arranged to produce treated water having predetermined properties of less than about 200 mg/l of sulfate, a total dissolved solids (TDS) content in the range of about 1000 mg/l to about 5000 mg/l, and a hardness level in the range of about 100 ppm to about 1000 ppm without blending or remineralizing the treated water with a source of hardness;
a sensor configured to measure at least one parameter of the seawater selected from the group consisting of composition, total dissolved solids concentration, sulfate concentration, and hardness, at the inlet of the electrically-driven separation subsystem; and
a controller, in communication with the sensor and the electrically-driven separation subsystem, configured to:
selectively direct a first portion of the seawater to the first electrodialysis unit and a second portion of the seawater to the second electrodialysis unit based on the measured parameter to produce first and second product streams, respectively, such that the first product stream has a greater concentration of hardness than the second product stream; and
blend the first and second product streams to produce the treated water having the predetermined properties.

14. The system of claim 13, wherein the electrically-driven separation subsystem is constructed and arranged to produce water having less than about 100 mg/l of sulfate.

15. The system of claim 14, wherein the electrically-driven separation subsystem is constructed and arranged to produce water having less than about 40 mg/l of sulfate.

16. The system of claim 13, wherein the first electrodialysis unit and the second electrodialysis unit are fluidly connected in parallel.

17. The system of claim 13, wherein about 5% of ion exchange membranes in the electrically-driven separation subsystem are monovalent selective cation exchange membranes.

18. The system of claim 13, further comprising a source of waste heat thermally coupled to the source of seawater.

19. The system of claim 13, wherein the controller is configured to adjust at least one of a flow rate or a current density associated with the electrically-driven separation subsystem.

20. The system of claim 13, wherein the first electrodialysis apparatus and the second electrodialysis apparatus are fluidly connected in parallel.

* * * * *